United States Patent

[11] 3,554,560

| [72] | Inventor | Hideo Miyake<br>Moriguchi-shi, Japan |
|---|---|---|
| [21] | Appl. No. | 832,340 |
| [22] | Filed | June 11, 1969 |
| [45] | Patented | Jan. 12, 1971 |
| [73] | Assignee | Kabushiki Kaisha Komatsu Seisakusho<br>(Komatsu Mfg. Co. Ltd.)<br>Tokyo, Japan |
| [32] | Priority | June 26, 1969 |
| [33] | | Japan |
| [31] | | No. 43/53713 |

[54] SEALING DEVICE SERVING CONCURRENTLY AS A THRUST BEARING DEVICE FOR A HINGE JOINT OF ENDLESS TRACK LINKS
4 Claims, 8 Drawing Figs.

[52] U.S. Cl. ..................... 277/92, 277/42
[51] Int. Cl. ..................... F16j 15/38
[50] Field of Search ........................... 277/42, 81, 83, 88, 89, 90, 92

[56] References Cited
UNITED STATES PATENTS

| 1,956,366 | 4/1934 | Vedovell | 277/88X |
| 2,984,506 | 5/1961 | Anderson et al. | 277/42 |
| 3,480,285 | 11/1969 | Anderson | 277/88 |
| 3,480,338 | 11/1969 | Durham et al. | 277/92 |

*Primary Examiner*—Laverne D. Geiger
*Assistant Examiner*—Robert I. Smith
*Attorney*—Steinberg and Blake ABSTRACT: A sealing device serving concurrently as a thrust bearing device for a hinge joint of endless track links comprising an annular wave shaped spring, a metal ring and an annular resilient member. The annular wave-shaped spring so made of hard steel and fitted in an annular recess formed in one pair of links. The metal ring is substantially L-shaped in section and also fitted in said annular recess. The metal ring is caused by said wave-shaped spring to press against one end of a bushing which is secured to another pair of links adjacent said one pair of links for pivotal connection therewith. The annular resilient member is mounted between an offset portion of said metal ring and a pin firmly secured to said one pair of links and has dimensions slightly larger than the clearance between said offset portion of said metal ring. Said pin, said annular wave-shaped spring, said metal ring and said annular resilient member form a unit and are mounted in said annular recess between said pairs of links pivotally connected to each other.

INVENTOR.
HIDEO MIYAKE
BY Sternberg & Blake
attys

INVENTOR.
HIDEO MIYAKE
BY Sternberg & Blake
attys

SEALING DEVICE SERVING CONCURRENTLY AS A THRUST BEARING DEVICE FOR A HINGE JOINT OF ENDLESS TRACK LINKS

BACKGROUND OF THE INVENTION

The present invention relates to sealing devices in general, and more particularly the invention deals with a sealing device serving concurrently as a thrust bearing device for a hinge joint of endless track links which provides improved means for preventing wear and tear of the pin and lateral surfaces of the hinge connection.

In a crawler for such vehicles as tractors or bulldozers, in accordance with the prior art, the endless track mechanism usually comprises a plurality of ground-engaging track shoes each of which is secured to a pair of spaced track links pivotally connected to adjacent pairs of track links to form an endless chain. In the endless track chain, a pin is pressed into a bore formed in a link so as to fix the former on the latter. A bushing is pressed into a bore formed in the adjacent link so as to fix the former on the latter firmly. A hinge connection is composed of such a pin inserted into such a bushing. The track chain thus constructed is trained about suitable guiding rollers and a driving sprocket to provide a rail surface for the supporting track rollers to ride thereon. Since the link and bushing constituting a hinge connection are firmly secured on different links of adjacent pairs of links and there are some rotations of the track chain on the driving sprocket and the guiding rollers when they are engaged with each other, a high surface pressure develops in the interface between the pin and bushing constituting a hinge connection. This high surface pressure often leads to heat generation between the pin and bushing and abrasion of these elements because the pin and bushing move in sliding motion relative to each other while the pin makes one-half revolution.

The track mechanism is subjected to an extremely heavy duty in an environment of a particularly abrasive nature. The clearance between the pin and bushing is apt to be intruded by fine particles of mud and sand, sea water and abrasive material so as to accelerate abrasion and corrosion thereof. As a result, the pitch of the track chain is elongated rapidly. The elongation of the pitch amounts to 2 to 3 millimeters for about 3,000 working hours when the endless track links are operated in the field where pebbles are abundant. The elongation amounts to over 10 millimeters when the endless track chains are operated in the river or on the damp ground. When the pitch of the track chain is elongated, the center portion of the bushings becomes C-shaped and the pin is exposed to atmosphere. With the hinge connection in this state, the driving sprocket does not mesh correctly with the bushings and the teeth thereof become round in shape. Thus, the endless track chain becomes inoperative.

When the bulldozer or tractor changes the direction of its movement and moves while it is inclined to right or left, a thrust load is applied to the link connection. Application of such a thrust load results in relative motion of the surfaces of one link of one pair of links and one pair of another pair of links adjacent said one pair of links and the surfaces of the recess formed in said one link of said one pair of links and one end of the bushing firmly secured to said one link of said another pair of links while a high surface pressure prevails in the interfaces. This causes abrasion of these parts and results in zigzagging of the endless track. The lateral surfaces of the center portion of the links impinge on the lateral surfaces of the teeth of the driving sprocket, causing rapid abrasion of the track links and driving sprocket and rendering the endless track inoperative.

Several attempts have hitherto been made to provide a seal to the pin and bushing to prevent abrasion of the inner surfaces of the pin and bushing. In one sealing device know in the art, an O-ring of rubber or other resilient material and a metal ring are mounted in an annular recess formed in each of one pair of links to surround a pin firmly secured on said pair of links so that the O-ring may press by its resilience the metal ring against an end of a bushing firmly secured on another pair of links adjacent said one pair of links to thereby provide a seal to the clearance between the pin and bushing. This sealing device has a disadvantage in that the O-ring made of rubber or other resilient material cannot cope with the transverse movement of the links or bear a thrust load applied to the links. If the links move in pivotal motion relative to each other while one presses against the other with a great force, the O-ring will be damaged and broken and the seal device cannot serve its purpose.

The present invention obviates the aforementioned disadvantages of prior art sealing devices for a hinge joint of endless track links. Accordingly, an object of the invention is to provide an improved sealing device serving concurrently as a thrust bearing device which permits to provide a seal to the clearance between the pin and bushing and also to make it possible for the sealing device to serve as a thrust bearing device for a hinge joint of endless track links.

Additional objects as well as features and advantages of the invention will become apparent from the description set forth hereunder when considered in conjunction with the accompanying drawings.

DESCRIPTION OF THE PREFERRED EMBODIMENTS

Figure 1:
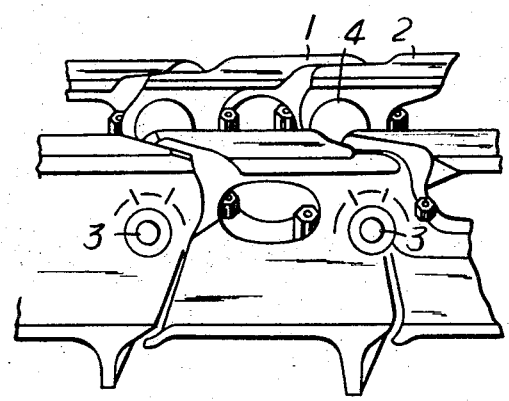
FIG. 1 is a fragmentary perspective view of endless track links.

FIG. 1 shows in a fragmentary perspective view of endless track links in which the sealing device according to this invention is incorporated.

Figure 2:
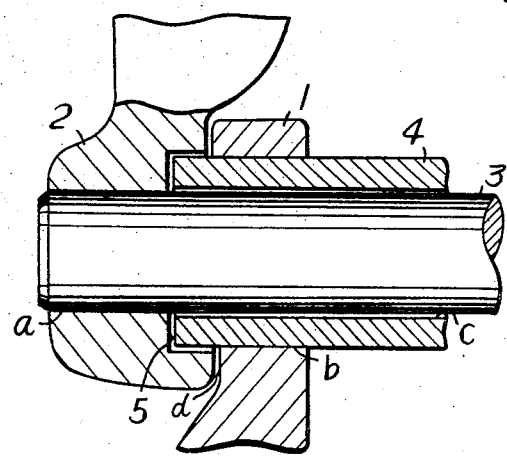
FIG. 2 is a sectional front view of conventional track links.

In FIG. 2, a pin 3 is firmly secured on a link 2 at a portion designated a, and a bushing 4 is firmly secured on a link 1 at a portion designated b. A high surface pressure is developed in an interface designated c between the pin 3 and bushing 4, since there are some rotations of the track chain on the driving sprocket and the guiding rollers when they are engaged with each other. When the bulldozer or tractor makes a turn and moves while it is inclined, a thrust load is applied to the hinge connection and the surfaces of the links 1 and 2 and the surface 5 of a recess formed in the link 2 and an end surface of the bushing 4 move relative to each other under high surface pressure in the interfaces.

Figure 4:
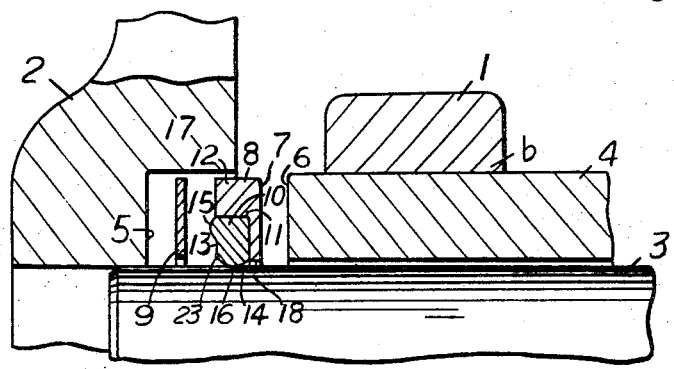
FIG. 4 is a sectional front view similar to FIG. 3 but showing the essential portions of the device being assembled to form a unit.
Figure 5:
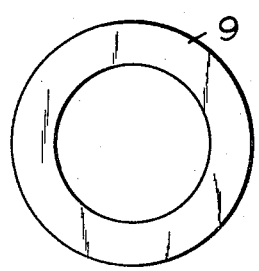
FIGS. 5A and 5B are a plan view and a sectional side view, respectively of a wave-shaped spring.
Figure 5:

The invention will now be explained with reference to FIG. 4. The sealing device serving concurrently as a thrust bearing device comprises an annular wave-shaped spring 9 of rectangular cross section made of hard steel, a metal ring 8 of substantially L-shaped cross section, and a resilient member 10 made of rubber or other like material bonded to or fitted into an offset portion 11 of said metal ring 8, said spring, said metal ring and said resilient member forming a unit and fitted in an annular recess 19 formed between an end surface 6 of the bushing 4 and the surface 5 of the link 2.

Figure 3:
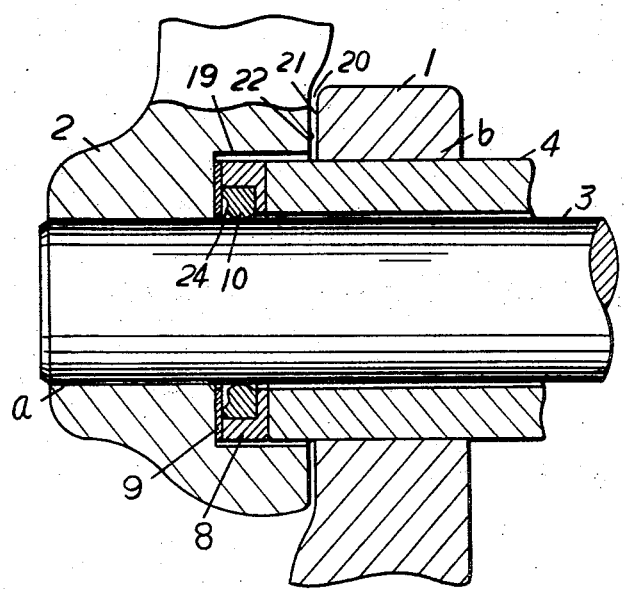
FIG. 3 is a sectional front view of track links embodying the sealing device serving concurrently as a thrust bearing device according to this invention which has effect in preventing elongation of the pitch of the endless track links.

As shown in FIG. 3, the annular wave-shaped spring 9 of the rectangular cross section which is maintained in contact with the surface 5 of the link 2 causes the metal ring 8 of substantially L-shaped cross section to press at its lateral surface 7 against the end surface 6 of the bushing 4 with a strong force. This arrangement is conducive to prevention of intrusion of sand and other foreign matter into a clearance between the bushing 4 and pin 3. The annular resilient member 10 made of rubber or like material bonded to or inserted into the offset portion 11 of the metal ring 8 surrounds the outer circumferential surface of the link 3 with a strong force. This arrangement is conducive to prevention of intrusion of foreign matter into the clearance between the bushing 4 and pin 3 and abrasion of the contacting surfaces of the bushing and pin. In addition, the arrangement performs the function of bearing a thrust load applied to the hinge connection of endless track links. If the thrust load applied is an excessively large magnitude, the wave-shaped spring 9 made of hard steel is deformed into a ring of planar surface so as to thereby prevent damage to the elements of the hinge joint.

The resilient member 10 made of rubber or like material is maintained in intimate contact with the offset portion 11 of the metal ring 8 so that it is prevented from undergoing an excessive compression deformation. This makes it possible for the sealing device according to this invention to achieve satisfactory sealing results.

The sealing device serving concurrently as a thrust bearing device according to this invention is constructed as aforementioned. The presence of a large thickness portion 12 of the metal ring 8 of substantially L-shaped cross section maintained in contact with the wave-shaped spring 9 in the annular clearance between the end face 6 of the bushing 4 and the surface 5 of the recess formed in the link 2 can prevent the resilient member 10 maintained in contact with the offset portion 11 of the metal ring 8 from being compressed beyond a certain limit. This prevents the resilient member 10 from being damaged. The resilient member 10 has free end surface 24 which is defined with an elevation 15, a depression 13, a semicircular corner portion 23, an elevator 16, and a depression 14. Said elevation 16, said depression 13, said semicircular corner portion 23, said elevation 16 and said depression 14 are successively connected. The elevations 15 and 16 may extend slightly beyond surfaces 17 and 18 of the metal ring 8 of substantially L-shaped cross section whereby the sealing device can achieve better results.

Figure 6:
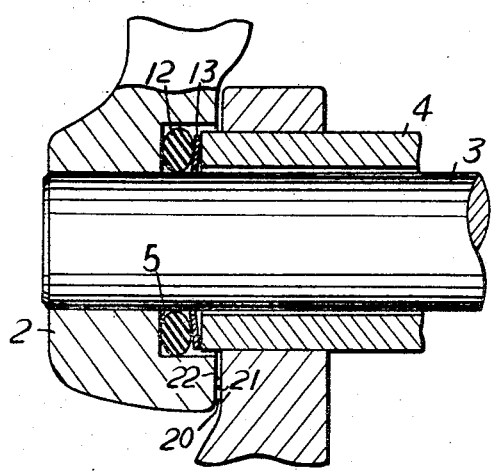
FIG. 6 is a sectional front view of track links having another sealing device of the prior art mounted therein.

The sealing device has as its object the prevention of intrusion of foreign matter into the clearance between the surfaces 6 and 5. A conventional sealing device uses a resilient member as shown in FIG. 6 which is mounted in the clearance. Such device is not without a disadvantage. When this sealing device is used, the links 1 and 2 are brought into contact with each other at surfaces 21 and 22 near an annular projection 20 of the link 2 (FIG. 3) resulting in wear and tear of these surfaces and an increased clearance between the links 1 and 2. This causes the bushing to be damaged and the resilient member to be crushed and damaged.

The sealing device embodying the present invention can obviate the aforementioned disadvantage of the prior art device. The sealing device according to this invention can have a long service life and is effective in preventing elongation of the pitch of the track chain and bearing a thrust load applied to the track links.

The surface of the resilient member 10 which is adapted to come into contact with the spring 9 may be formed in wave shape. This prevents compression deformation of the resilient member 10 beyond certain limits when an excessively high thrust load is applied to the hinge connection.

Figure 7:
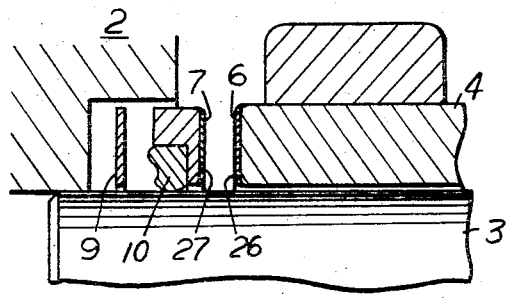
FIG. 7 is a sectional front view similar to FIG. 4 but showing the surface of the metal ring and the end surface of the bushing which have a coating of wear-resistant superhard material.

As shown in FIG. 7, the surface 7 of the metal ring 8 and the end surface 6 of the bushing which are adapted to come into intimate contact with each other may have a coating 27 or 28 of a wear-resistant superhard material selected from the group including nickel, tungsten and molybdenum and applied thereto by metallization or bonding to increase the wear resistance of the sliding surfaces and the sealing capacity of the device. This is conducive to better performance and a longer service life of the sealing device.

I claim:

1. A sealing device serving concurrently as a thrust bearing device for a hinge joint of endless track links comprising an annular wave-shaped spring made of hard steel fitted in an annular recess in one pair of links, a metal ring substantially L-shaped in section also fitted in said annular recess and caused by said wave-shaped spring to press against one end of a bushing secured to another pair of links adjacent said one pair of links for pivotal connection therewith, and an annular resilient member mounted between an offset portion of said metal ring and a pin firmly secured to said one pair of links and having dimensions slightly larger than the clearance between said offset portion of said metal ring and said annular resilient member, said annular wave-shaped spring, said metal ring and said annular resilient member forming a unit and mounted in said annular recess between said pairs of links pivotally connected to each other.

2. A sealing device as defined in claim 1 in which said metal ring is wave-shaped in its surface which is maintained in contact with said annular wave-shaped spring.

3. A sealing device as defined in claim 1 in which the resilient member comprising free end defined with an elevation, a depression, a semicircular corner portion, an elevation and a depression which are successively connected.

4. A sealing device as defined in claim 1 in which surfaces of said annular ring and said bushing maintained in contact with each other have a coating of a wear-resistant superhard material selected from the group including nickel, tungsten and molybdenum and applied thereto by metallization or bonding to increase the wear resistance of sliding surfaces and the sealing capacity of the device.